United States Patent
Wallace (10) Patent No.: US 10,105,653 B2
(45) Date of Patent: Oct. 23, 2018

(54) SYSTEM FOR RINSING ELECTRODIALYSIS ELECTRODES

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 849 days.

(21) Appl. No.: 13/965,568

(22) Filed: Aug. 13, 2013

(65) Prior Publication Data

US 2014/0042029 A1 Feb. 13, 2014

Related U.S. Application Data

(60) Provisional application No. 61/682,603, filed on Aug. 13, 2012.

(51) Int. Cl.
*B01D 61/52* (2006.01)
*B01D 61/58* (2006.01)
(Continued)

(52) U.S. Cl.
CPC ............ *B01D 61/52* (2013.01); *B01D 61/04* (2013.01); *B01D 61/44* (2013.01); *B01D 61/58* (2013.01);
(Continued)

(58) Field of Classification Search
CPC .. B01D 19/0036; B01D 61/445; B01D 61/52; C25B 1/26; C25B 1/265; C25B 1/46;
(Continued)

(56) References Cited

U.S. PATENT DOCUMENTS 3,595,766 A * 7/1971 Scheder ................ B01D 61/44
204/527
4,127,235 A 11/1978 Klaile et al.
(Continued)

FOREIGN PATENT DOCUMENTS

GB 1052034 A * 12/1966 ............ B01D 61/44
WO 2007094659 A1 8/2007
WO WO 2012166997 A2 * 12/2012 ............... C01B 7/01

OTHER PUBLICATIONS

McDonald, M. R., McClintock, J. B., Amsler, C. D., Rittschoff, D., Angus, R. A., Orihuela, B. & Lutostankski, K., "Effects of Ocean Acidification Over the Life History of the Barnacle Amphibalanus Amphitrite," Marine Ecology Progress Series 385:179-187 (2009).
(Continued)

*Primary Examiner* — Steven A. Friday
(74) *Attorney, Agent, or Firm* — Fletcher Yoder, PC (57) ABSTRACT

A system for rinsing electrodialysis electrodes includes an anode input coupled to an anode of an electrodialysis (ED) system for receiving a first fluid from the anode. The first fluid is for removing ions from the anode. The system also includes an anode output coupled to the anode of the ED system for providing the first fluid to the anode. The system includes a cathode input coupled to a cathode of the ED system for receiving a second fluid from the cathode. The second fluid is for removing ions from the cathode of the ED system. The system also includes a cathode output coupled to the cathode of the ED system for providing the second fluid to the cathode. The system includes an air stripper for receiving the first and/or second fluid, and for removing oxygen and/or a chlorine gas from the first and/or second fluid.

17 Claims, 5 Drawing Sheets

(51) Int. Cl.
C02F 1/469 (2006.01)
B01D 61/04 (2006.01)
B01D 61/44 (2006.01)
C02F 1/20 (2006.01)
C02F 1/44 (2006.01)
C02F 1/52 (2006.01)
C02F 1/66 (2006.01)
B01D 61/02 (2006.01)

(52) U.S. Cl.
CPC .......... C02F 1/4693 (2013.01); B01D 61/025 (2013.01); B01D 61/445 (2013.01); B01D 2311/26 (2013.01); B01D 2311/268 (2013.01); B01D 2311/2626 (2013.01); B01D 2311/2642 (2013.01); B01D 2311/2649 (2013.01); B01D 2317/02 (2013.01); C02F 1/20 (2013.01); C02F 1/441 (2013.01); C02F 1/5236 (2013.01); C02F 1/66 (2013.01); C02F 2201/4618 (2013.01); C02F 2201/4619 (2013.01)

(58) Field of Classification Search
CPC ....... C01B 11/062; C01D 13/00; C02F 1/469; C02F 1/4693; C02F 1/4695
See application file for complete search history.

(56) References Cited

U.S. PATENT DOCUMENTS

| | | | |
|---|---|---|---|
| 4,163,046 | A | 7/1979 | Subramanian et al. |
| 4,298,442 | A | 11/1981 | Giuffrida |
| 4,381,232 | A | 4/1983 | Brown |
| 4,405,463 | A | 9/1983 | Jost et al. |
| 4,436,429 | A | 3/1984 | Strong et al. |
| 4,725,425 | A | 2/1988 | Lesher et al. |
| 5,162,076 | A * | 11/1992 | Chiao ............... B01D 61/445 204/534 |
| 5,221,528 | A | 6/1993 | Jongema |
| 5,250,185 | A | 10/1993 | Tao et al. |
| 5,366,514 | A | 11/1994 | Becnel, Jr. et al. |
| 5,417,491 | A | 5/1995 | Hornung et al. |
| 5,765,945 | A | 6/1998 | Palmer |
| 5,858,240 | A | 1/1999 | Twardowski et al. |
| 5,925,255 | A | 7/1999 | Mukhopadhyay |
| 6,030,535 | A | 2/2000 | Hayashi et al. |
| 6,036,740 | A | 3/2000 | Miller et al. |
| 6,183,644 | B1 | 2/2001 | Adams et al. |
| 6,461,491 | B1 * | 10/2002 | Hryn ............... B01D 61/52 204/523 |
| 6,482,305 | B1 | 11/2002 | Mani |
| 7,083,730 | B2 | 8/2006 | Davis |
| 7,147,361 | B2 | 12/2006 | Cecala et al. |
| 7,392,848 | B1 | 7/2008 | Bader |
| 7,459,088 | B2 | 12/2008 | Davis |
| 7,501,064 | B2 | 3/2009 | Schmidt et al. |
| 7,595,001 | B2 | 9/2009 | Arakel et al. |
| 7,861,955 | B2 | 1/2011 | Tracy et al. |
| 2006/0120858 | A1 * | 6/2006 | Taylor ............... B01D 19/0094 415/169.1 |
| 2007/0189945 | A1 | 8/2007 | Kopp et al. |
| 2008/0185340 | A1 | 8/2008 | Bargeman et al. |
| 2008/0237123 | A1 | 10/2008 | Marston |
| 2009/0127360 | A1 | 5/2009 | Tracy et al. |
| 2010/0163471 | A1 | 7/2010 | Elyanow et al. |
| 2011/0198285 | A1 | 8/2011 | Wallace |
| 2011/0289846 | A1 | 12/2011 | Shaw et al. |
| 2011/0303607 | A1 | 12/2011 | Vora et al. |

OTHER PUBLICATIONS

Markus Busch, William E. Mickols, Steve Jons, Jorge Redondo, Jean De Witte, "Boron Removal in Sea Water Desalination," International Desalination Association, BAH03-039 (2003).

NRS Engineering Water Solutions, "Final Pilot Study Report—Texas Seawater Desalination Demonstration Project," (Oct. 2008).
Collin Green "Using Gypsum for the Treatment of Mine Water," Department of Chemical and Metallurgical Engineering, Faculty of Natural Sciences, Technikon Pretoria (Dec. 2003).
Stephen R. Grattan "Irrigation Water Salinity and Crop Production," University of California, Davis—Agriculture and Natural Resources, ANR Publication 8066 (2002).
Mai Gavrieli Amos Bein, and Aharon Oren, "The Expected Impact of the Peace Conduit Project (The Red Sea-Dead Sea Pipeline) on the Dead Sea," Mitigation and Adaptation Strategies for Global Change, 10:3-22 (2005).
DOW Water Solutions, "Filmtec™ Reverse Osmosis Membranes," Technical Manual, Form No. 609-00071; (2010) pp. 1-180.
DOW Water Solutions, "Dowtm Filmtec™ Membranes—DOW™ Filmtec™ SW3OXLE-440i Seawater Reverse Osmosis Element with iLEC Interlocking Endcaps," Product Information. Form No. 609-03003-1109; (2010) pp. 1-2.
DOW Water Solutions, "DOW™ Filmtec™ Membranes—DOW™ Filmtec™ SW30ULE-440i Seawater Reverse Osmosis Element with iLEC™ Interlocking Endcaps," Product Information, Form No. 609-03004-1109; (2010) pp. 1-2.
DOW Water Solutions, "Filmtec™ Membranes—Filmtec™ XLE-440 Extra Low Energy RO Element," Product Information. Form No. 609-00245-0606; (2010) pp. 1-2.
DOW Water Solutions, "DOW™ Ultrafiltration—High Turbidity and Temperature Fluctuation No Obstacle for DOW™ Ultrafiltration," Case History, Form No. 795-00020-1108; (2010) pp. 1-5.
FAO Corporate Document Repository, Agriculture and Consumer Protection, "Water Quality for Agriculture"; http://www.fao.org/DOCREP/003/T0234E/TO234E05.htm (Feb. 10, 2010) pp. 1-15.
Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.
GE Water and Process Technologies, "Cloromat—" Solution for Manufacturing Chlor-Alkali Chemicals: Sodium Hypochlorite, Hydrochloric Acid & Caustic Soda, Fact sheet (May 2008) p. 1-4.
GE Power & Water—Water & Process Technologies, "HERO" (2010) pp. 1-2.
ICL, "Harnessing Nature Creating Value," 3rd Annual NASDAQ-TASE Israeli Investor Conference, New York (Sep. 18, 2008) pp. 1-47.
Applied Membranes, Inc., "Water Treatment Guide—" Temperature Correction Factor for Reverse Osmosis Membranes, (2007) pp. 1-2.
Nitto Denko and Hydranautics, "Chemical Pretreatment for RO and NF," Technical Application Bulletin No. 111, Revision C (Dec. 2008) pp. 1-16.
Chemical Processign.com, "To Avoid Silica-Scale Problems in Cooling Towers, Plant Personnel Turn to Unconventional Methods," Water Treatment's Gordion Knot; http://www.chemicalprocessing.com/articles/2003/235.html?page=print; (2003) pp. 1-9.
"Desalination: A National Perspective," Committee on Advancing Desalination Technology, National Research Council, The National Academies—Advisers to the Nation on Science, Engineering, and Medicine (2008) pp. 1-255.
Public Health and the Environment World Health Organization, "Desalination for Safe Water Supply—Guidance for the Health and Environmental Aspects Applicable to Desalination," Geneva (2007) pp. 1-173.
Gerald L. Mackie and Barb Crosbie, "Zebra Mussel Biofouling Control in Cottage and Other Small Volume Water Systems," The Georgian Bay Association (1999) pp. 1-87.
Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem, vol. 13, No. 3, (2007) 452-456.
EPA Selenium Purification_Scandium (1998) pp. 1-62.
Yoshinobu Tanaka, Reo Ehara, Sigeru Itoi, Totaro Goto, "Ion-exchange membrane electrodialytic salt production using brine (56) References Cited

OTHER PUBLICATIONS discharged from a reverse osmosis seawater desalination plant," Journal of Membrane Science 222 (2003) 71-86.

Reclamation—Managing Water in the West, Desalination and Water Purification Research and Development Program Report No. 135, Pilot Testing of Zero-Discharge Seawater Desalination-Application to Selenium Removal from Irrigation Drainage, U.S. Department of the Interior Bureau of Reclamation, Apr. 2008, pp. 1-37.

Sallie J. Lee, Frank J. Liotta, Steven a. Schwartz, "A New Generation of Gypsum Dispersing Agents," Global Gypsum Conference 2003—Barcelona, Sep. 14-16, 2003, pp. 17.1-17.12.

T. Masuzawa, "Impurities Contained Inside the Crystals of Solar and Vacuum Evaporated Salts," Fifth International Symposium on Salt—Northern Ohio Geological Society, May 29-Jun. 1, 1979, Hamburg, Germany, pp. 463-473.

Seung Joon Kim, Young Geun Lee, Sanghoun Oh, Yun Seok Lee, Young Mi Kim, Moon Gu Jeon, Sangho Lee, In S. Kim, Joon Ha Kim, "Energy saving methodology for the SWRO desalination process: controrl of operating temperature and pressure," Desalination 249 (2009) 260-270.

Peter Eriksson, Markus Kyburz, Wil Pergande, "NF membrane characteristics and evaluation for sea water processing applications," Desalination 184 (2005) 281-294.

EPA Selenium Purification (1991) pp. 1-8.

\* cited by examiner

SYSTEM FOR RINSING ELECTRODIALYSIS ELECTRODES

CROSS REFERENCE TO RELATED APPLICATIONS

This application benefits from the priority of U.S. Provisional Patent Application No. 61/682,603, entitled "System for Rinsing Electrodialysis Electrodes" filed Aug. 13, 2012, which is hereby incorporated by reference in its entirety.

The following applications are also incorporated by reference in their entirety:

U.S. Provisional Patent Application No. 61/682,585, entitled "System for Removing Minerals from a Brine Using Electrodialysis," filed Aug. 13, 2012, U.S. Provisional Patent Application No. 61/682,590, entitled "Heating System for Desalination" filed Aug. 13, 2012, U.S. Provisional Patent Application No. 61/682,596, entitled "System for Removing High Purity Salt from a Brine" filed Aug. 13, 2012, U.S. Provisional Patent Application No. 61/682,609, entitled "System for Removing Selenium from a Feed Stream" filed Aug. 13, 2012, and U.S. Provisional Patent Application No. 61/682,612, entitled "System for Producing a Gypsum Slurry for Irrigation" filed Aug. 13, 2012.

BACKGROUND

The subject matter disclosed herein relates generally to electrodialysis (ED) electrodes, and more particularly, a system for rinsing ED electrodes.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, the need for innovative technologies and alternative water supplies for both drinking water and agriculture is important. One method for obtaining an alternative source of potable water uses desalination systems to produce the potable water.

The desalination process may involve the removal of salts from seawater, agricultural run-off water, and/or brackish ground water brines to produce potable water. Membrane-based desalination may use an assortment of filtration methods, such as nanofiltration and reverse osmosis, to separate the raw brine stream into a desalinated water stream and a tailing stream. The tailing streams may contain various salts and other materials left over after the desalination process. Included in these tailing streams may be valuable salts and minerals which may be extracted using membrane-based and/or evaporative techniques.

One such mineral extraction technique utilizes electrodialysis (ED) to facilitate ion exchange and/or the enrichment of certain minerals. However, ED and other membrane-based techniques may be susceptible to membrane oxidation and degradation due to bleach, acid, chlorine, and/or other impurities. The impurities may result from mineral deposits caused by ion leakage across the membranes and/or formed by chemical conversion in response to imbalances in the circulating pH levels of a rinse solution. In certain configurations, ED electrodes may produce byproducts, such as magnesium hydroxide, calcium hydroxide, and chlorine, which may contaminate the rinse solution and degrade the electrodes and/or deposit scale on the membranes. Calcium sulfate may also form in the electrode compartments if calcium from the process brines enters the electrode compartment and mixes with the sulfate used to maintain conductivity in the rinse solutions. Unfortunately, rinse systems may not remove impurities and/or control the pH of the rinse solution.

BRIEF DESCRIPTION

In one embodiment, a system includes an anode fluid input configured to be fluidly coupled to an anode portion of an electrodialysis (ED) system and to receive a first fluid from the anode portion. The first fluid is configured to remove ions from the anode portion of the ED system. The system also includes an anode fluid output configured to be fluidly coupled to the anode portion of the ED system and to provide the first fluid to the anode portion. The system includes a cathode fluid input configured to be fluidly coupled to a cathode portion of the ED system and to receive a second fluid from the cathode portion. The second fluid is configured to remove ions from the cathode portion of the ED system. The system also includes a cathode fluid output configured to be fluidly coupled to the cathode portion of the ED system and to provide the second fluid to the cathode portion. The system includes an air stripper configured to receive the first fluid, the second fluid, or some combination thereof, and to remove oxygen, a chlorine gas, or some combination thereof from the first fluid, the second fluid, or some combination thereof.

In another embodiment, a system includes an anode fluid input configured to be fluidly coupled to an anode portion of an electrodialysis (ED) system and to receive a first fluid from the anode portion. The first fluid is configured to remove ions from the anode portion of the ED system. The system also includes an anode fluid output configured to be fluidly coupled to the anode portion of the ED system and to provide the first fluid to the anode portion. The system includes a cathode fluid input configured to be fluidly coupled to a cathode portion of the ED system and to receive a second fluid from the cathode portion. The second fluid is configured to remove ions from the cathode portion of the ED system. The system also includes a cathode fluid output configured to be fluidly coupled to the cathode portion of the ED system and to provide the second fluid to the cathode portion. The system includes an electrodialysis bipolar membrane (EDBM) unit configured to produce an acid, a base, or some combination thereof. The system is configured to mix the acid, the base, or some combination thereof with the first fluid, the second fluid, or some combination thereof.

In another embodiment, a system includes an anode fluid input configured to be fluidly coupled to an anode portion of an electrodialysis (ED) system and to receive a first fluid from the anode portion. The first fluid is configured to remove ions from the anode portion of the ED system. The system also includes an anode fluid output configured to be fluidly coupled to the anode portion of the ED system and to provide the first fluid to the anode portion. The system includes a cathode fluid input configured to be fluidly coupled to a cathode portion of the ED system and to receive a second fluid from the cathode portion. The second fluid is configured to remove ions from the cathode portion of the ED system. The system includes a cathode fluid output configured to be fluidly coupled to the cathode portion of the ED system and to provide the second fluid to the cathode portion. The system also includes a vacuum flash drum configured to receive the first fluid, the second fluid, or some combination thereof, and to remove hydrogen gas from the first fluid, the second fluid, or some combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
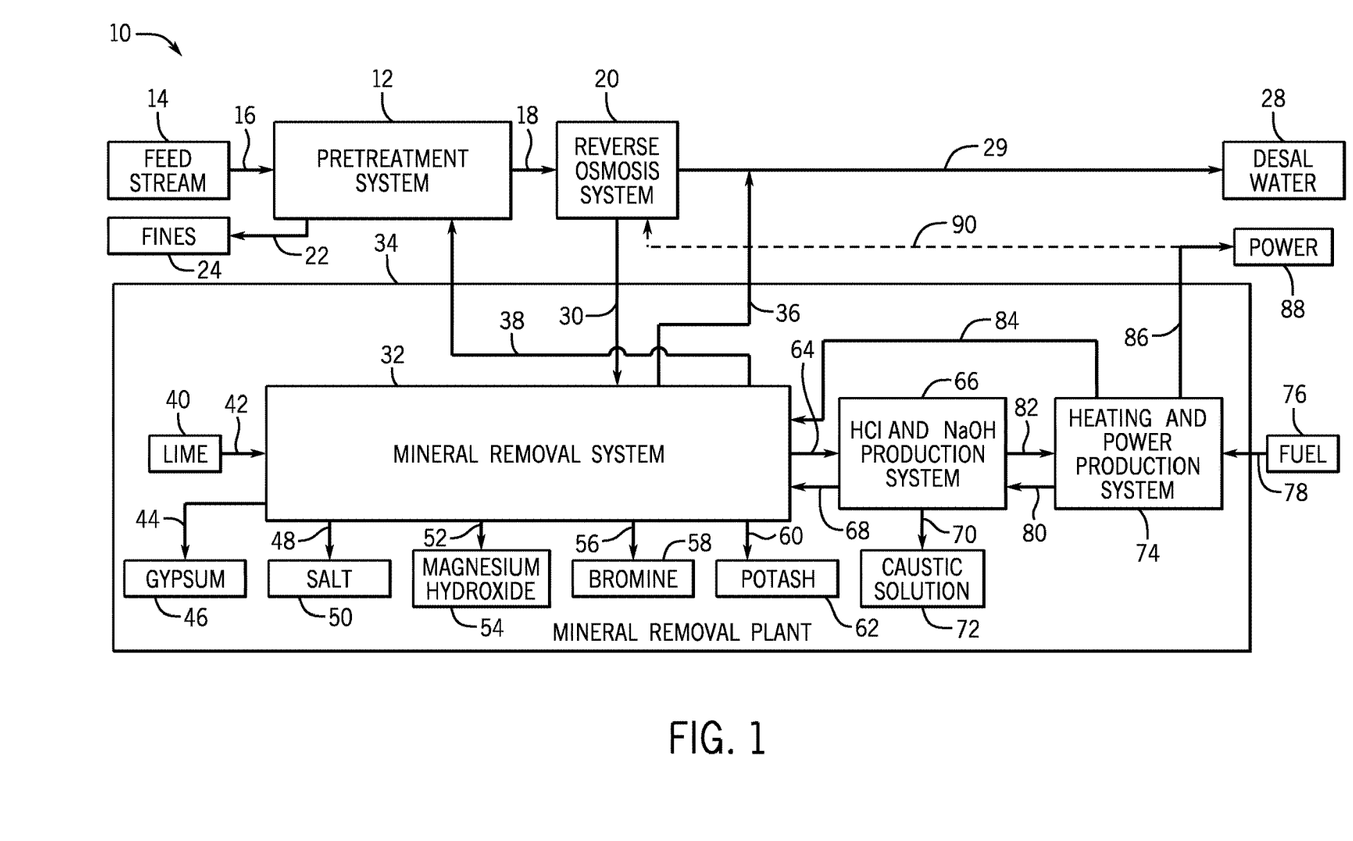
FIG. 1 is a block diagram of an embodiment of a water processing system, in accordance with aspects of the present disclosure.

FIG. 1 is a block diagram of an embodiment of a water processing system 10. The water processing system 10 is used to produce desalinated water from a feed stream and to remove minerals from the feed stream. For example, the water processing system 10 may be used to produce high purity agricultural grade gypsum (e.g., approximately greater than 97 wt % gypsum on a dry basis), industrial grade caustic (e.g., approximately greater than 97 wt % NaOH on a dry basis), industrial grade magnesium hydroxide (e.g., approximately greater than 98 wt % MgO on an ignited basis, or on an ignited oxide basis) suitable for industrial magnesia refractory, industrial grade sodium chloride (e.g., approximately greater than 99.9 wt % NaCl on a dry basis), and/or desalinated water (e.g., approximately less than 1000 wppm total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14 as an input 16. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain sodium chloride (NaCl), sulfate ($SO_4$), calcium (Ca), magnesium (Mg), and/or silicon dioxide (silica or $SiO_2$). In certain embodiments, the feed stream 14 may contain approximately 0.50 to 3.00 g/l NaCl, approximately 0.10 to 1.50 g/l $SO_4$, approximately 0.01 to 0.80 g/l Ca+ Mg, and/or approximately 0.01 to 0.30 g/l $SiO_2$. Furthermore, in certain embodiments, the feed stream 14 may have a pH range between approximately 5 and 9. Specifically, the feed stream 14 may have a pH of approximately 8.

The pretreatment system 12 receives the feed stream 14 and removes solid materials (e.g., fines) from the feed stream 14. The pretreatment system 12 provides the pretreated feed stream 14 as a first output 18 to a reverse osmosis (RO) system 20. Moreover, the pretreatment system 12 provides a second output 22 that contains fines 24, such as iron (Fe) and manganese (Mn). The RO system 20 receives the pretreated feed stream 14 and produces desalinated water 28 as a first output 29. In certain embodiments, the desalinated water 28 may include $SiO_2$. Moreover, the desalinated water 28 may have a pH of approximately 7.5. Furthermore, the RO system 20 provides a brine stream as a second output 30 to a mineral removal system 32. In certain embodiments, the desalinated water 28 may be approximately 70 to 90 percent of the output from the RO system 20, and the brine stream may be approximately 10 to 30 percent of the output from the RO system 20. Specifically, in some embodiments, the desalinated water 28 may be approximately 80 percent of the output from the RO system 20, and the brine stream may be approximately 20 percent of the output from the RO system 20. As may be appreciated, while the illustrated embodiment uses the RO system 20, other embodiments may use NF in place of RO.

The mineral removal system 32 is part of a mineral removal plant 34. The mineral removal plant 34 is configured to remove minerals, elements, and/or compounds from the brine stream. As may be appreciated, the brine stream may be provided to the mineral removal plant 34 from any suitable source and/or system. In certain embodiments, the brine stream may include substantial amounts of sodium chloride, sulfate, calcium, and/or magnesium. The mineral removal system 32 may provide one or more outputs 36 that include desalinated water (which may contain silicon dioxide). Furthermore, the one or more outputs 36 may include a disinfectant and/or oxidant. The disinfectant and/or oxidant may be provided to the pretreatment system 12 via an output 38.

A lime based material 40 (e.g., lime, quick lime, dolomitic lime, etc.) may be provided to an input 42 of the mineral removal system 32 to facilitate mineral removal from the brine stream. The mineral removal system 32 may be configured to remove any suitable mineral, elements, and/or compounds from the brine stream. For example, the mineral removal system 32 may provide a first output 44 including gypsum 46 (e.g., agricultural grade gypsum), a second output 48 including salt 50 (e.g., industrial grade sodium chloride), a third output 52 including magnesium hydroxide 54 (e.g., industrial grade magnesium hydroxide), a fourth output 56 including bromine 58, and/or a fifth output 60 including potash 62.

In certain embodiments, the mineral removal system 32 may provide one or more outputs 64 to a hydrochloric acid (HCl) and sodium hydroxide (NaOH) production system 66. Furthermore, the mineral removal system 32 may receive one or more inputs 68 from the HCl and NaOH production system 66. For example, the mineral removal system 32 may provide a sodium chloride brine to the HCl and NaOH production system 66. Moreover, the mineral removal system 32 may receive HCl, caustic, and/or NaOH produced by the HCl and NaOH production system 66. In certain embodiments, the HCl and NaOH production system 66 may provide an output 72 of a caustic solution 70 (e.g., NaOH) or HCl solution that is not used by the mineral removal system 32 (e.g., produced to be sold).

The mineral removal plant 34 also includes a heating and power production system 74. In certain embodiments, the heating and power production system 74 may include a natural gas engine and/or a boiler. The heating and power production system 74 is configured to receive a fuel 76 at an input 78. The fuel 76 may be any suitable fuel, such as natural gas. The heating and power production system 74 is configured to provide one or more outputs 80 to the HCl and NaOH production system 66. The one or more outputs 80 may include power, steam, hot water, any suitable heated fluid, and so forth. Moreover, the heating and power production system 74 is configured to receive a cooled fluid (such as water) via one or more inputs 82. As illustrated, the heating and power production system 74 is configured to provide power to the mineral removal system 32 via a first output 84. Moreover, the heating and power production system 74 includes a second output 86 configured to provide power 88 to another system and/or to provide a power output 90 to the RO system 20.

Figure 2:
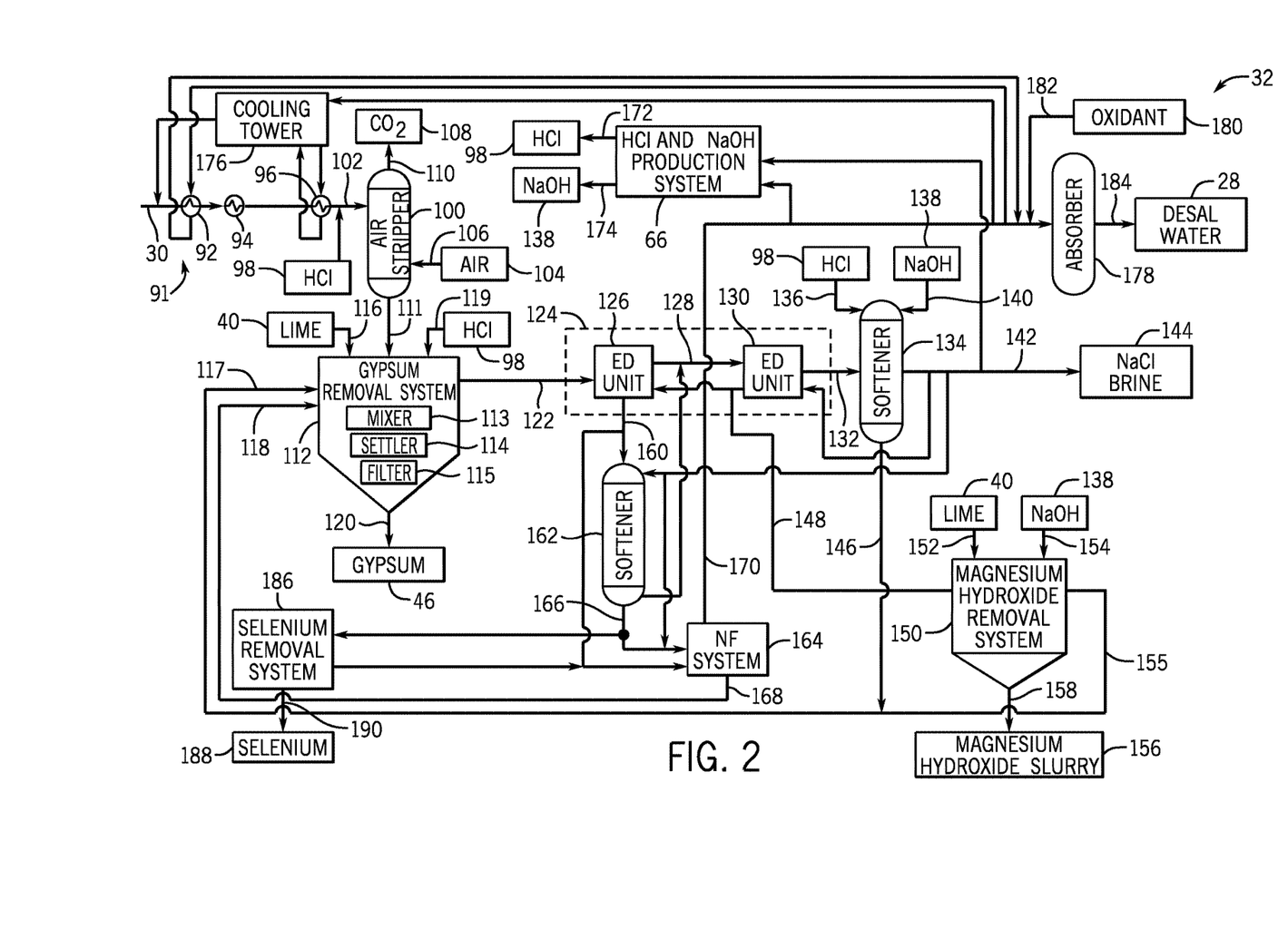
FIG. 2 is a block diagram of an embodiment of a mineral removal system, in accordance with aspects of the present disclosure.

FIG. 2 is a block diagram of an embodiment of the mineral removal system 32. As previously described, the mineral removal system 32 receives at an input the brine stream from the output 30 of the RO system 20. As may be appreciated, the brine stream may contain various elements and/or compounds. For example, the brine stream may contain NaCl, $SO_4$, Ca, Mg, and/or $SiO_2$. In certain embodiments, the brine stream may contain approximately 3.0 to 8.0 g/l NaCl, approximately 3,000 to 8,000 weight parts per million (wppm) $SO_4$, approximately 100 to 400 wppm Mg, approximately 200 to 600 wppm Ca, and/or approximately 50 to 200 wppm $SiO_2$. Furthermore, in certain embodiments, the brine stream may have a pH range between approximately 4 and 8. Specifically, the brine stream may have a pH of approximately 6. In the illustrated embodiment, a temperature control system 91 is used to control heating of the brine stream. Moreover, the temperature control system 91 includes a first heat exchanger 92, a second heat exchanger 94, and a third heat exchanger 96 to aid in controlling the temperature of the brine stream.

The brine stream is mixed with HCl 98 to convert bicarbonate ($HCO_3^-$) and carbonate ($CO_3^{2-}$) in the brine stream to $CO_2$, thereby decreasing the pH to less than 4. The acidified brine stream is routed to an air stripper 100 via a first input 102. The air stripper 100 uses air 104 provided to a second input 106 of the air stripper 100 to facilitate removal of the $CO_2$ 108 from the brine stream via a first output 110. In certain embodiments, multiple stages are used in the air stripper 100 to enable a low residual (e.g., less than approximately 2 ppm). As may be appreciated, a low $CO_2$ residual may inhibit carbonate reformation and scaling when the pH of the brine stream is increased during the various downstream brine treatment steps.

The $CO_2$ stripped brine stream is provided via a second output 111 of the air stripper 100 to a gypsum removal system 112. The gypsum removal system 112 may include a mixer 113, a settler 114, and a filter 115 to facilitate removal of the gypsum 46 from the brine stream (e.g., feed stream). Accordingly, within the mixer 113, the $CO_2$ stripped brine stream is mixed with: the lime based material 40 (e.g., lime, quick lime, dolomitic lime, etc.) received by a first input 116 of the gypsum removal system 112, recycled concentrated calcium chloride ($CaCl_2$) brine (e.g., such as a brine containing approximately 4 to 25 wt % $CaCl_2$) received by a second input 117, and recycled NF non-permeate (e.g., a sodium sulfate ($Na_2SO_4$) rich brine) received by a third input 118. In certain embodiments, such as embodiments with feed brines having a lower $Na_2SO_4$ content, the second output 111 may bypass the gypsum removal system 112. Accordingly, only the second input 117 and the third input 118 may be provided to the gypsum removal system 112. Furthermore, in such an embodiment, the second output 111 may be mixed with a brine output stream 122 from the gypsum removal system 112.

HCl 98 may be added to the gypsum removal system 112 via a fourth input 119. In certain embodiments, the lime based material 40 and the HCl 98 may be pre-mixed into the recycle calcium chloride brine stream to increase calcium content in the mixer 113 of the gypsum removal system 112 and/or in the mineral removal system 32. For example, this may be beneficial when the $SO_4$ to (Mg+Ca) molar ratio is greater than approximately 1.0 since it provides supplemental calcium to allow substantial (e.g., complete, nearly complete, etc.) sulfate removal as gypsum 46. In other embodiments, commercial calcium chloride brine, flakes, or pellets may be added to the mixer 113 of the gypsum removal system 112 when the brine stream is deficient in calcium. Furthermore, in certain embodiments, HCl 98 and limestone may also be added to the recycle calcium chloride brine and the brine stripped in a second air stripper to remove the residual $CO_2$. As may be appreciated, limestone may be procured at a lower cost than lime; however, the second air stripper may be necessitated by the use of the limestone.

The overall molar ratio of Ca to $SO_4$ in the brine stream entering the gypsum removal system 112 may be controlled to approximately 0.8 to 1.2 by calcium addition to the mixer 113 (e.g., HCl 98 plus the lime based material 40, $CaCl_2$, and/or HCl 98 plus limestone with additional air stripping) as discussed above, and/or by removing a portion of the concentrated $CaCl_2$ brine as a byproduct. Recycled gypsum 46 seed crystals are added to the mixture within the mixer 113 of the gypsum removal system 112. The calcium in the concentrated $CaCl_2$ brine stream reacts with the sulfate in the brine stream received by the gypsum removal system 112 from the air stripper 100 and the recycle NF non-permeate to precipitate gypsum 46. In certain embodiments, approximately 50% to 70% of the sulfate is removed from the brine stream. The presence of gypsum 46 seed crystals in the mixer 113 (e.g., a turbulent mixer) at neutral pH (e.g., a pH of approximately 6 to 8) may facilitate gypsum 46 precipitation kinetics, thereby enabling rapid gypsum precipitation. At the mixer 113 effluent the solution reaches near saturation conditions (e.g., slightly supersaturated) with respect to gypsum 46 and the slurry is pumped to the settler 114.

In addition to gypsum 46 precipitation, insoluble calcium fluoride ($CaF_2$) also precipitates in the mixer 113 thereby removing a substantial portion of the fluoride from the stripped brine stream; thereby inhibiting fluoride scaling in the electrodialysis (ED) system. In the settler 114 the gypsum 46 crystals settle and the saturated near solids free solution is decanted off, and filtered by the filter 115 (e.g., a sand filter, a microfilter, an ultrafilter, and so forth) to remove residual gypsum 46 particles. A small amount of softened salt brine is recycled to the settler 114 overflow to increase gypsum 46 solubility and desaturate the brine stream, thereby inhibiting scaling in the filter 115 and other downstream units. The settler 114 bottoms may be routed to a hydroclone and filter to wash (e.g., with desalinated product water) and concentrate the gypsum 46 into a saleable washed filter cake. In certain embodiments, the filter cake may include approximately 70 to 100 wt % gypsum 46. Specifically, the filter cake may include approximately 90 wt % gypsum 46. Thus, gypsum 46 is provided as an output 120 from the gypsum removal system 112. The fine solids overflow stream from the hydroclone is recycled to the mixer 113 as seed crystals. The filtrate from the filter 115 is recycled to the settler 114.

The gypsum removal system 112 may remove approximately 60 to 75% of the gypsum received from the second output 111 and produces the brine stream output 122 having a reduced amount of gypsum relative to the second output 111. For example, the brine stream output 122 (e.g., recycle brine stream output) may contain less than approximately 5 g/l gypsum, while the second output 111 may contain approximately 12 to 20 g/l gypsum. Furthermore, in certain embodiments, the brine stream output 122 may contain approximately 5.0 to 15.0 g/l NaCl and/or approximately 1,000 to 3,000 wppm $SO_4$. Moreover, the brine stream output 122 may have a pH of approximately 6. The brine stream output 122 is provided to an electrodialysis (ED) system 124. Furthermore, as illustrated, the gypsum removal system 112 is fluidly coupled to the ED system 124. In certain embodiments, a guard cartridge filter may be disposed between the brine stream output 122 and the ED system 124 to filter the brine stream output 122 thereby blocking gypsum scale from passing to the ED system 124. The ED system 124 is configured to receive the brine stream output 122 from the gypsum removal system 112, to produce a substantially sulfate hardness (e.g., Ba, Sr, Ca) free sodium sulfate solution, to produce a sodium chloride solution, and to produce a mineral solution. In the illustrated embodiment, the ED system 124 includes a first ED unit 126 that provides an intermediate output 128 to a second ED unit 130. In certain embodiments, the intermediate output 128 may include approximately 70 to 120 g/l total dissolved solids (TDS).

The first ED unit 126 (e.g., mixed chloride extraction ED) extracts a substantial portion (e.g., approximately 65% to 80%) of the magnesium chloride, calcium chloride, and sodium chloride from the brine stream output 122 using non-permselective cationic membranes and monovalent permselective anionic membranes to produce a concentrated (e.g., approximately 3 to 25 wt %) barium chloride, strontium chloride, magnesium chloride, calcium chloride, sodium chloride brine that is substantially sulfate free that is provided via the intermediate output 128 to the second ED unit 130. At a pH of approximately 6 both boric acid and silica are in a non-ionic form and thus are not extracted by the ED into the intermediate output 128 having the concentrated brine stream. As may be appreciated, barium (Ba), strontium (Sr), magnesium, and calcium chlorides are preferentially extracted versus sodium chloride through non-permselective cation membranes. Thus, a diluate brine output 160 from the first ED unit 126 is a dilute $Na_2SO_4$ brine with reduced barium, strontium, calcium, and magnesium content and very low chloride content (e.g., a substantially sulfate hardness free sodium sulfate solution). For example, the substantially sulfate hardness free sodium sulfate solution may include less than approximately 200 mg/l (Ca+Sr+ Ba) and/or approximately 3 to 5 g/l sulfate.

In certain embodiments, the first ED unit 126 may include a two-stage ED configuration for mixed chloride extraction ED. For example, a first stage may extract approximately 70-90% of the mixed chlorides as a low sulfate, high concentration product concentrate. Furthermore, a second stage may be fed by the first stage diluate and the brine stream output 122. Residual mixed chlorides in the first stage diluate may be extracted into the brine stream output 122, which may be fed to the first stage. As may be appreciated, the two-stage design may increase ED power consumption and size, however, the two-stage design may facilitate a sharper separation and higher recoveries of sulfate in relation to the diluate product and chloride in relation to the mixed chloride concentrate product.

In some embodiments, a portion of an NF non-permeate from a segregated fully softened feed may be used as a supplemental rinse solution in cells adjacent to the electrode cells, thereby inhibiting calcium contamination of an electrode rinse solution. The return supplemental rinse solution may be recycled to the gypsum settler 114. Moreover, for seawater based brines, NF permeate may be used as a supplemental rinse solution (due to its high salt content and higher conductivity) which may be recycled back to the NF feed.

The high concentration calcium chloride brine from the intermediate output 128 is provided to the second ED unit 130 (e.g., a NaCl extraction ED) that selectively removes a substantial portion (e.g., approximately 80% to 95%) of the NaCl using monovalent permselective cation and anion membranes. In certain embodiments, the second ED unit 130 may include a two-stage ED configuration for NaCl extraction. For example, a first stage may extract approximately 70 to 90% of the NaCl as a low hardness, high concentration product concentrate. Moreover, the second stage may be fed by the first stage diluate and may produce a low NaCl, $CaCl_2$, $MgCl_2$ rich product diluate, and an intermediate concentration NaCl concentrate with higher hardness, which is recycled back to the feed of the first stage. As may be appreciated, the two-stage design may increase ED power consumption and size; however, the two-stage design may allow for a sharper separation and higher recoveries of $CaCl_2$ and $MgCl_2$ in relation to the diluate product and NaCl in relation to the concentrate product.

A NaCl brine (e.g., sodium chloride solution) is provided as an output 132 from the second ED unit 130. The NaCl brine has a low magnesium content and is provided (e.g., pumped) to an ion exchange brine softener 134 (e.g., such as an Amberlite™ IRC747 manufactured by The Dow Chemical Company of Midland, Mich.) where a substantial portion (e.g., approximately greater than 99%) of the calcium and magnesium are removed. Dilute HCl 98 is provided via an input 136 and NaOH 138 (e.g., approximately 4 wt %) is provided via an input 140 to the softener 134. The HCl 98 and the NaOH 138 are used to regenerate the ion exchange brine softener 134. The ion exchange brine softener 134 provides an output 142 of a high concentration NaCl brine 144. The high concentration NaCl brine 144 may include approximately 150 to 300 g/l NaCl. In certain embodiments, the NaCl brine 144 may be provided to the HCl and NaOH production system 66 to aid in producing HCl and NaOH. Furthermore, the NaCl brine 144 may be used to regenerate a second ion exchange softener 162, such as in brackish water feed brines. Moreover, the NaCl brine 144 may be used to produce a high purity salt for a chlor alkali plant, bleach plant, mixed oxidant plant, other chemical and industrial uses, and/or for any suitable purpose. As illustrated, a purge stream may provide the NaCl brine 144 to the second ED unit 130. The pH of the purge stream may be controlled to approximately 2.5 by HCl 98 injection, thereby converting residual fluoride to hydrogen fluoride (HF) and inhibiting fluorite scaling or NaCl brine contamination with fluoride. In certain embodiments, RO permeate or other low sulfate, low silica, low boric acid containing water may be added to prevent gypsum scaling if there is significant leakage of sulfate through the monovalent anion permselective membrane in the first ED unit 126. A low volume softener reject stream containing the calcium and magnesium may be provided by an output 146 and recycled directly to the settler 114 of the gypsum removal system 112.

The second ED unit 130 produces a concentrated $CaCl_2$, $MgCl_2$ brine stream low in NaCl (e.g., mineral solution) that is provided via an output 148. The output 148 is recirculated to the first ED unit 126 to aid in further extraction of the NaCl and the production of the high concentration NaCl brine 144. Furthermore, the output 148 is provided to a magnesium hydroxide removal system 150. As illustrated, the ED system 124 is fluidly coupled to the magnesium hydroxide removal system 150. In some embodiments (e.g., brackish water), the brine stream may contain approximately 500 to 2,000 wppm $SO_4$ and/or approximately 500 to 2000 wppm Mg, while in other embodiments (e.g., seawater), the brine stream may contain approximately 1,500 to 4,000 wppm $SO_4$ and/or approximately 600 to 2500 wppm Mg. Furthermore, the brine stream may have a pH of approximately 6. Moreover, the brine stream may include approximately 40 to 60 g/l TDS. In certain embodiments, the magnesium hydroxide removal system 150 may include a mixer (e.g., mixer 113), a settler (e.g., settler 114), and a filter (e.g., filter 115) to facilitate removal of the magnesium hydroxide from the concentrated $CaCl_2$, $MgCl_2$ brine stream (e.g., feed stream). In some embodiments, the magnesium hydroxide removal system 150 may be configured to remove approximately 90 to 98% of Mg from the brine stream.

The low NaCl concentrated $CaCl_2$/$MgCl_2$ product brine from the ED system 124 is enriched in magnesium and lean in sulfate due to the upstream gypsum removal system 112, and the ED system 124. In certain embodiments, the brine provided to the output 148 may be approximately 1 to 15% of the brine stream 30 provided to the mineral removal system 32. The lime based material 40 (e.g., lime, dolomitic lime, etc.) is provided to the magnesium hydroxide removal system 150 via an input 152 to precipitate magnesium hydroxide. A similar arrangement to the gypsum removal system 112 (e.g., mixer 113, settler 114, filter 115, etc.) may be used to produce a washed magnesium hydroxide filter cake and a low magnesium effluent brine. A portion of the magnesium hydroxide removal system 150 effluent may be used to produce a slaked lime slurry to facilitate lime mixing with the $CaCl_2$/$MgCl_2$ ED product brine. In addition to the lime based material 40, excess NaOH 138, such as from the HCl and NaOH production system 66, may be provided to the magnesium hydroxide removal system 150 via an input 154, thereby facilitating a reduction in the lime based material 40 and/or reducing the $CaCl_2$ export for brines with high (Ca+Mg) to $SO_4$ molar feed ratios (e.g., where the ratio of (Ca+Mg) to $SO_4$ is greater than approximately 1.0).

Overflow from a settler of the magnesium hydroxide removal system 150 may provide an output 155 of concentrated $CaCl_2$ brine that is recycled back to the gypsum removal system 112. The $CaCl_2$ in the brine combines with sulfate in the primary gypsum settler 114 to facilitate precipitation of gypsum 46. In certain embodiments, the output 155 may have a pH of approximately 10. The magnesium hydroxide removal system 150 outputs magnesium hydroxide slurry 156 via an output 158. In certain embodiments, the magnesium hydroxide slurry 156 may include greater than approximately 98 wt % magnesium oxide (MgO) on a calcinated basis.

Returning to the first ED unit 126, the first ED unit 126 provides an ED dilute stream (e.g., a substantially sulfate hardness free sodium sulfate solution) to an output 160. Moreover, for low salinity brackish water feeds (e.g., NaCl less than approximately 10 g/l) provided to the mineral removal system 32, the ED diluate stream from the first ED unit 126 has a TDS content of less than approximately 7 g/l (e.g., 5 g/l). Accordingly, as illustrated, the ED diluate stream from the first ED unit 126 is provided to a strong acid cation (SAC) ion exchange softener 162. The lower TDS content of the ED diluate stream enables the use of SAC ion exchange softening resins which are regenerated using NaCl brine 144, as discussed previously. The SAC ion exchange softener 162 exchanges calcium and magnesium ions in the ED diluate stream for sodium and inhibits gypsum scaling in a downstream NF system 164 that receives an output 166 from the SAC ion exchange softener 162. As illustrated, a purge stream of the NaCl brine 144 may be provided to the NF system 164 in conjunction with the output 166 to facilitate descaling.

All or part of the ED diluate stream is routed to the SAC ion exchange softener 162 based a scaling potential of the NF system 164. Relatively high sulfate hardness levels in the SAC softener effluent 166 (e.g., approximately 10-100 ppm) are used to minimize brine consumption. SAC ion exchange softener 162 resins are regenerated using the NaCl brine 144, and the spent brine from regeneration containing mainly $CaCl_2$ and $MgCl_2$ with residual NaCl is routed to the second ED unit 130, thereby facilitating recycling of the residual NaCl for producing the concentrated CaCl2, MgCl2 brine low in NaCl suitable for feed to the magnesium hydroxide removal system 150. As may be appreciated, for seawater based NF brines or high salinity feed brines, softening is not required to inhibit gypsum scaling in the downstream NF system 164. This is because the elevated NaCl content in the NF feed and non-permeate increases the gypsum solubility, thereby inhibiting scaling in the NF unit.

The ED diluate stream from the first ED unit 126, which has been optionally softened by the SAC ion exchange softener 162 is routed to the NF system 164 via outputs 160 and/or 166. In certain embodiments, approximately 60 to 80% of the ED diluate stream permeates the NF. The remaining 20 to 40% NF non-permeate contains substantially all of the sulfate, approximately 60 to 90% of the calcium, approximately 80 to 90% of the magnesium, and approximately 20 to 50% of the NaCl. Thus, a non-permeate stream output from the NF system 164 via output 168 is slightly supersaturated with respect to gypsum 46 (e.g., 1.6 saturation index defined as ion product/Ksp, which corresponds to a dissolved gypsum content of 125% of saturation). Significant scaling does not occur on the NF membranes of the NF system 164 because the kinetics of gypsum crystallization are slow in the NF membranes (e.g., no seed crystals, acidic pH, low mixing turbulence, etc.).

Periodically (e.g., approximately every 6-8 hours) a slug of high purity NaCl brine (e.g., 100-200 g/l NaCl, less than 50 ppm Ca, less than 20 ppm SO4) is injected individually into each NF element of the NF system 164. This may result in a brief (e.g., 30 second) period of reverse flow across the NF membrane in a direct osmosis, high salinity process. The high purity NaCl brine directs the gypsum microcrystals to be removed from the surface of the NF elements and dissolved in the NaCl brine, thereby inhibiting long term growth of gypsum scale since the seed microcrystals are removed before scaling kinetics can accelerate. The supersaturated NF non-permeate containing substantially all of the sulfate is recycled to the settler 114 of the gypsum removal system 112 via the output 168. In certain embodiments, the supersaturated NF non-permeate may contain approximately 8,000 to 12,000 wppm $SO_4$, approximately 300 to 500 wppm Ca, approximately 100 to 300 wppm Mg, approximately 0.8 to 1.5 g/l NaCl, and/or approximately 15 to 25 g/l TDS.

An NF permeate stream is provided via an output 170 from the NF system 164. For low salinity brackish water brine feeds the NF permeate stream may have a low TDS and thereby may meet EPA drinking water standards. Furthermore, as may be appreciated, NF membranes with increased NaCl removal may be desirable to produce drinking water with lower TDS content. It should be noted that the selection of the NF membrane may be made so that silica concentration and scaling does not occur on the NF membrane with high NaCl removal.

As illustrated, the NF permeate stream from output 170 is provided to the HCl and NaOH production system 66. The HCl and NaOH production system 66 is used to produce one or more HCl 98 outputs 172 and/or to produce one or more NaOH 138 outputs 174. Furthermore, the NF permeate stream from output 170 may be provided to the first heat exchanger 92 to facilitate heat transfer from the brine stream 30 to the NF permeate. Moreover, the NF permeate stream from output 170 may be provided to a cooling tower 176 where the NF permeate stream is cooled before flowing through the third heat exchanger 96 to facilitate heat transfer from the brine stream 30 to the NF permeate. As illustrated, the cooling tower 176 may also provide a portion of the NF permeate stream to the brine stream 30.

As may be appreciated, arsenic (e.g., as arsenite) in the brine stream 30 (e.g., from brackish groundwater treatment) may pass through the gypsum removal system 112 and the NF system 164, thereby ending up in the NF permeate stream from the output 170. Accordingly, in certain embodiments, the arsenic is not removed by NF membranes. If necessary to meet drinking water standards the arsenic may be removed from the NF permeate stream using an arsenic absorber 178. Within the arsenic absorber 178, the NF permeate stream is chlorinated with chlorine, sodium hypochlorite, and/or mixed oxidant 180 received via an input 182 thereby converting the arsenite to arsenate. The stream is then routed to a granular ferric hydroxide (GFH) or granular ferric oxide (GFO) absorption bed where the arsenate is absorbed and chemically sequestered as non-leachable ferric arsenate. Periodically the spent GFH or GFO may be removed and/or stored onsite for future arsenic reclaiming. Moreover, fresh GFH or GFO may be provided into the absorption beds. The absence of essentially all the sulfate and chloride in the NF permeate water along with its slightly acidic pH (e.g., approximately 5 to 6), make the GFH or GFO absorption of arsenic highly efficient and cost effective. The desalinated water 28 is provided by an output 184 from the arsenic absorber 178. While the arsenic absorber 178 is included in the illustrated embodiment, other embodiments may not include the arsenic absorber 178. In certain embodiments, the desalinated water 28 may contain approximately 50 to 150 mg/l $SiO_2$, approximately 10 to 50 mg/l Ca+Mg, approximately 0.3 to 0.9 g/l NaCl, and/or approximately 500 to 1000 ppm TDS.

In certain embodiments, a slipstream of the softened ED diluate stream from the first ED unit 126 may be routed to a biological or chemical selenium removal system 186. The selenium may be concentrated in this stream because it typically exists as selenate which has similar properties to sulfate. Moreover, the selenium does not permeate NF or anion monovalent permselective ED membranes and is more soluble than sulfate in the presence of calcium. Thus, the low NaCl, sulfate, $MgCl_2$ and $CaCl_2$ concentration in the ED diluate stream provide optimal conditions for the chemical or biological removal processes. For example, in certain embodiments, the ED diluate stream may contain approximately 3,000 to 5,000 wppm $SO_4$, approximately 100 to 150 wppm Ca, approximately 25 to 75 wppm Mg, and/or approximately 0.5 to 1.0 g/l NaCl. The selenium removal system 186 is configured to remove selenium from the ED diluate stream, to provide selenium 188 from a first output 190, and to provide a substantially selenium free ED diluate stream to the NF system 164.

Figure 3:
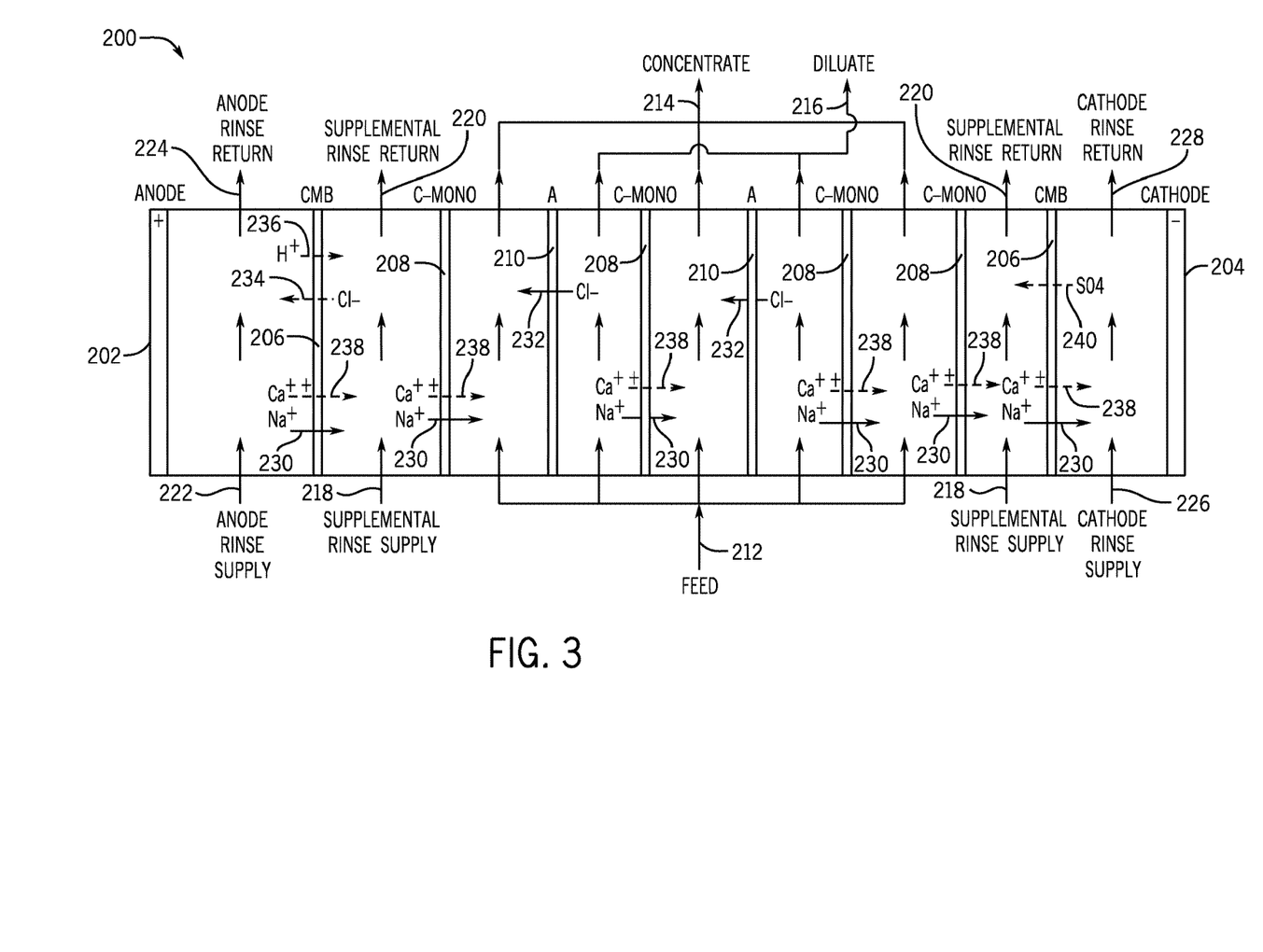
FIG. 3 is a block diagram of an embodiment of an electrodialysis (ED) unit, in accordance with aspects of the present disclosure.

FIG. 3 is a block diagram of an embodiment of an ED unit 200. In the illustrated embodiment, the ED unit 200 includes an ED stack having an anode 202, a cathode 204, cationic exchange membranes (CMBs) 206, monovalent permselective cationic membranes 208, and monovalent permselective anionic membranes 210. The ED unit 200 is configured to receive a feed stream 212. The feed stream 212 flows between the monovalent permselective cationic membranes 208 and the monovalent permselective anionic membranes 210 resulting in a concentrate stream 214 and a diluate stream 216 that are output from the ED unit 200. Furthermore, a supplemental rinse supply 218 flows between the CMBs 206 and the monovalent permselective cationic membranes 208, and a supplemental rinse return 220 is output from the ED unit 200. As illustrated, an anode rinse supply 222 flows into the ED unit 200 adjacent to the anode 202, and an anode rinse return 224 flows out of the ED unit 200 adjacent to the anode 202. Moreover, a cathode rinse supply 226 flows into the ED unit 200 adjacent to the cathode 204, and a cathode rinse return 228 flows out of the ED unit 200 adjacent to the cathode 204.

As the fluids flow through the ED unit 200, sodium ions ($Na^+$) 230 migrate through the various cationic membranes toward the cathode 204, as illustrated. Furthermore, chloride ions ($Cl^-$) 232 migrate through the monovalent permselective anionic membranes 210 toward the anode 202. As may be appreciated, various ions may leak through the membranes of the ED unit 200. For example, $Cl^-$ 234 may leak from the fluid provided by the supplemental rinse supply 218 to the fluid provided by the anode rinse supply 222 and hydrogen ions ($H^+$) 236 may leak from the fluid provided by the anode rinse supply 222 to the fluid provided by the supplemental rinse supply 218. Furthermore, calcium ions ($Ca^{++}$) 238 may leak through various cationic membranes toward the cathode 204. Moreover, sulfate ions ($SO_4^{--}$) 240 may leak from the fluid provided by the cathode rinse supply 226 to the fluid provided by the supplemental rinse supply 218. Accordingly, the concentrate stream 214, the diluate stream 216, the supplemental rinse return 220, the anode rinse return 224, and the cathode rinse return 228 are formed from the inputs to the ED unit 200.

Figure 4:
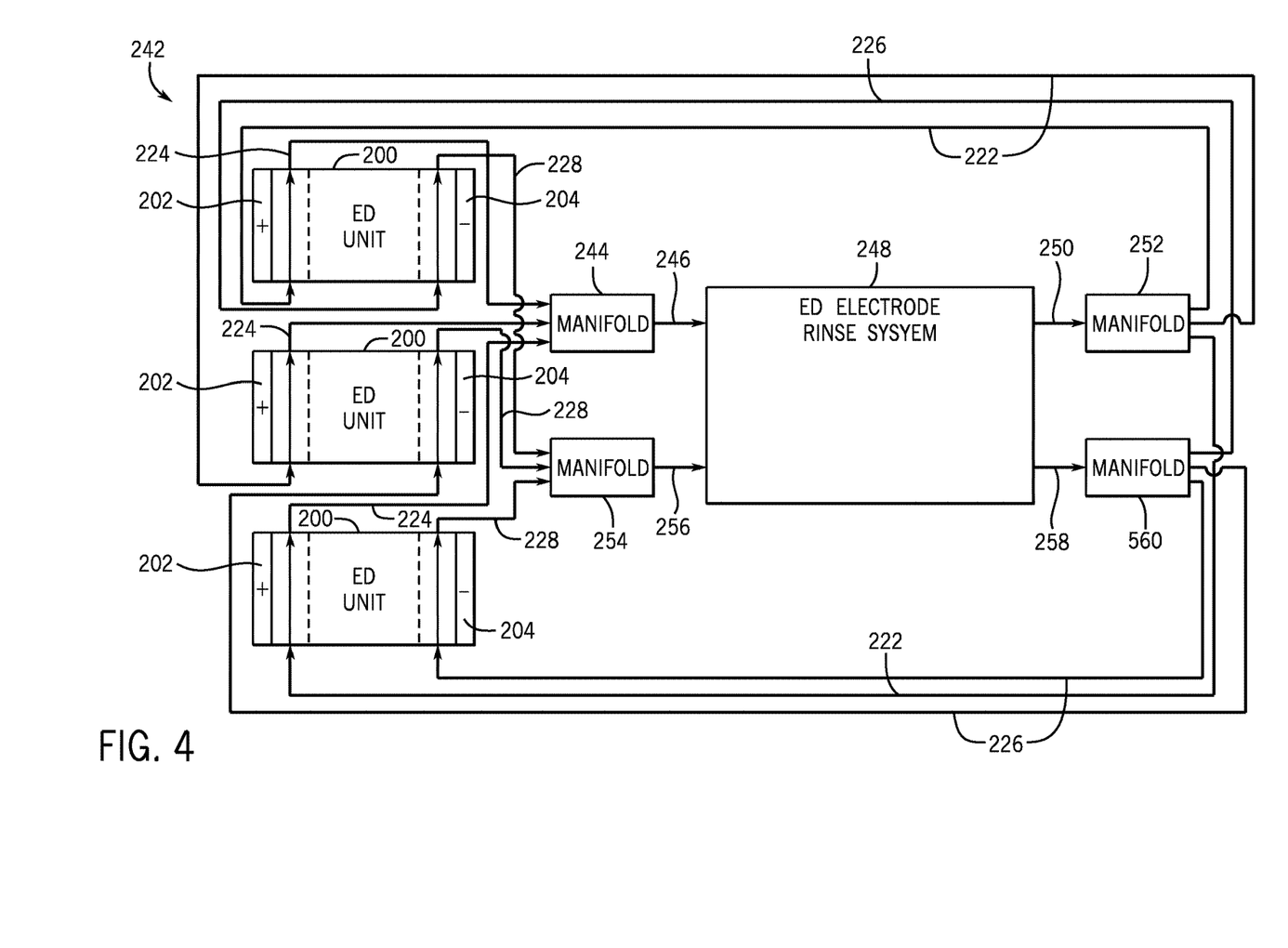
FIG. 4 is a block diagram of an embodiment of an ED system, in accordance with aspects of the present disclosure.

FIG. 4 is a block diagram of an embodiment of an ED system 242. The ED system 242 includes multiple ED units 200 each having the anode rinse supply 222, the anode rinse return 224, the cathode rinse supply 226, and the cathode rinse return 228. In the illustrated embodiment, a first fluid from the anode rinse returns 224 of the ED units 200 flows to a manifold 244 that provides the combined first fluid from the anode rinse returns 224 to an anode fluid input 246 of an ED electrode rinse system 248. The anode fluid input 246 is fluidly coupled to an anode portion (e.g., portion adjacent to the anode 202) of the ED units 200 and receives the first fluid from the anode portion of the ED units 200. The first fluid is configured to remove ions from the anode portion of the ED units 200. The ED electrode rinse system 248 is configured to receive the first fluid from the anode rinse returns 224, to receive a second fluid from the cathode rinse returns 228, to process the first fluid into the second fluid and provide the second fluid to the cathode rinse supplies 226, and to process the second fluid into the first fluid and provide the first fluid to the anode rinse supplies 222.

Accordingly, the ED electrode rinse system 248 provides the first fluid to an anode fluid output 250. The first fluid is directed from the anode fluid output 250 to a manifold 252 that separates the first fluid into separate flow paths that are provided to the anode rinse supplies 222. The anode fluid output 250 is fluidly coupled to the anode portion of the ED units 200 and provides the first fluid to the anode portion of the ED units 200. Moreover, the second fluid from the cathode rinse returns 228 of the ED units 200 flows to a manifold 254 that provides the combined second fluid from the cathode rinse returns 228 to a cathode fluid input 256 of the ED electrode rinse system 248. The cathode fluid input 256 is fluidly coupled to a cathode portion (e.g., portion adjacent to the cathode 204) of the ED units 200 and receives the second fluid from the cathode portion of the ED units 200. The second fluid is configured to remove ions from the cathode portion of the ED units 200. The ED electrode rinse system 248 provides the second fluid to a cathode fluid output 258. The second fluid is directed from the cathode fluid output 258 to a manifold 260 that separates the second fluid into separate flow paths that are provided to the cathode rinse supplies 226. The cathode fluid output 258 is fluidly coupled to the cathode portion of the ED units 200 and provides the second fluid to the cathode portion of the ED units 200.

Figure 5:
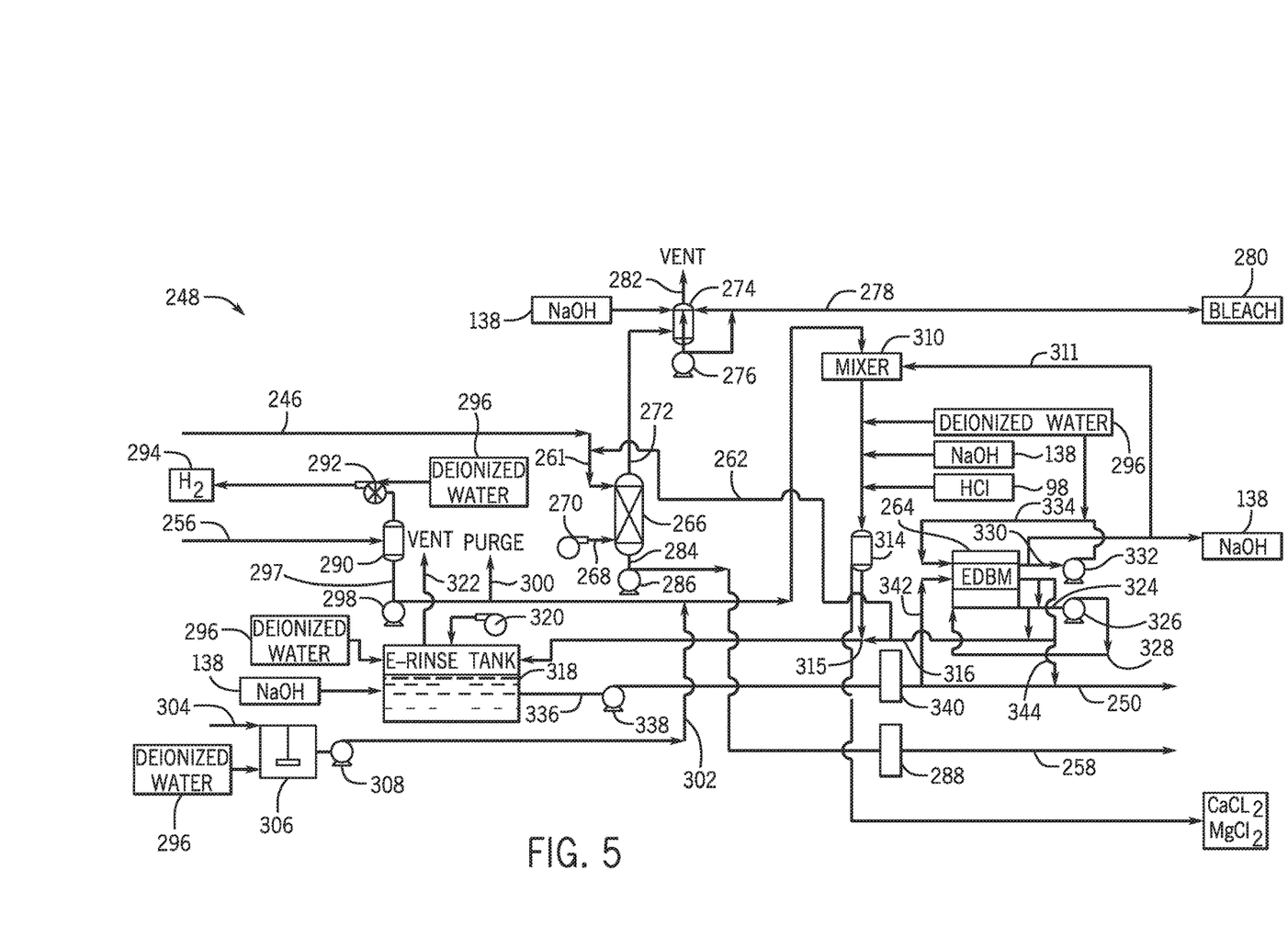
FIG. 5 is a block diagram of an embodiment of an ED electrode rinse system, in accordance with aspects of the present disclosure.

FIG. 5 is a block diagram of an embodiment of the ED electrode rinse system 248. The ED electrode rinse system 248 is configured to selectively remove calcium, magnesium, chloride, and/or hypochlorite (chlorine) from rinse fluids, thereby blocking scaling and oxidation of the ED membranes, reducing makeup sodium sulfate solution processing, and reducing purge brine disposal processing.

The ED electrode rinse system 248 receives a return anode rinse solution (e.g., first fluid) from the ED units 200, as discussed above. The return anode rinse solution is received by the anode fluid input 246 and may have a pH of approximately 1 to 1.5. As illustrated, at an acid input 261 the return anode rinse solution is mixed with a small amount of sulfuric acid 262 (e.g., to direct the return anode rinse solution toward an acidic pH) from an electrodialysis bipolar membrane (EDBM) unit 264 and the resulting fluid is routed to an anode rinse air stripper 266. Air 268 from a blower 270 is used to strip oxygen from the anode rinse solution. A small amount of chlorine gas is also stripped from the anode rinse solution. Chlorine is formed in the anode rinse solution since there is a small amount of chloride leakage from the process brine solutions through the cation permselective ED membrane (e.g., CMB 206) into the anode rinse solution.

Multistage high efficiency air stripping at a pH of less than 1.5 may remove substantially all the chlorine formed, thereby blocking membrane attack in the cathode rinse compartment for any residual chlorine remaining in the common recycle rinse supply solution, since any residual chlorine is converted to ionic NaOCl at an elevated pH (e.g., a pH greater than 6) in the cathode rinse compartment, which is drawn towards the membrane by the anode.

A stripper vent gas 272 containing mainly air and oxygen with traces of chlorine is routed to a vent gas scrubber 274 used to remove chlorine from the stripper vent gas 272. A circulating pump and spray 276 contacts the chlorine containing vent gas with a NaOH 138 solution to produce NaOCl. Makeup dilute NaOH 138 solution is added to facilitate maintaining the pH in the circulating loop above approximately 10. A purge 278 is taken from the circulating loop to remove a byproduct NaOCl bleach solution 280. This solution may be sold and/or routed to a desalination unit for use as a disinfectant for a product water stream. The vent gas scrubber 274 includes a vent 282 to release one or more gasses (e.g., air, $O_2$, trace amounts of $Cl_2$, etc.).

A stripped anode rinse 284 at a pH of approximately 1 to 1.5 is pumped by a pump 286 from the anode rinse air stripper 266 and routed to the cathode fluid output 258. As illustrated, the stripped anode rinse 284 may flow through a filter 288 (e.g., cartridge filter) before flowing out of the cathode fluid output 258. Acid produced in the anode 202 portion as well as the supplemental acid added to the return anode rinse solution may neutralize the hydroxide generated at the cathode 204 and thereby maintain a pH in the cathode 204 at mildly acidic levels (e.g., a pH of approximately 4 to 6), blocking magnesium hydroxide and/or calcium hydroxide scaling.

The ED electrode rinse system 248 receives a return cathode rinse solution (e.g., second fluid) from the ED units 200, as discussed above. The return cathode rinse solution is received by the cathode fluid input 256. The return cathode rinse solution may have a pH of approximately 4 to 6. Moreover, the return cathode rinse solution is routed to a vacuum flash drum 290 in which a vacuum pump 292 extracts hydrogen gas ($H_2$) 294 contained in the cathode rinse solution along with a small amount of water vapor. The hydrogen gas 294 is vented and may be routed to a boiler or natural gas engine. A small amount of deionized water 296 is added to the vacuum pump 292. Moreover, in certain embodiments, a small blowdown stream may be taken from the vacuum pump 292 to an electrode rinse tank 318. A vacuum flashed rinse solution 297 is pumped by a pump 298 to a static mixer 310.

A purge stream 300 from the vacuum flashed rinse solution 297 may be taken to a process brine system thereby blocking buildup of trace contaminants in the vacuum flashed rinse solution 297. A small quantity of makeup sodium sulfate solution 302 may be added to the vacuum flashed rinse solution 297. The makeup sodium sulfate solution 302 may be produced using industrial grade (e.g., high purity) sodium sulfate 304 dissolved in deionized water 296 using a mixer 306, or from a softened, low chloride process sodium sulfate solution. Moreover, the makeup sodium sulfate solution 302 is pumped using a pump 308 to be added to the vacuum flashed rinse solution 297. After removing the purge stream from and/or adding the makeup sodium sulfate solution 302 to the vacuum flashed rinse solution 297, a small amount of dilute caustic 311 (e.g., a base) from the EDBM unit 264 is injected and mixed with the vacuum flashed rinse solution 297 in the static mixer 310 to direct a pH of the solution toward a more basic pH. In certain embodiments, the resulting solution may be pH neutral (e.g., having a pH of approximately 6 to 8).

The pH neutral (e.g., a pH of approximately 6 to 8) electrode rinse solution is routed to an ion exchange (chelating resin) brine softener 314 to remove calcium and/or magnesium that has leaked into the electrode rinse solution from the ED units 200. Thus, gypsum, lime, and magnesium hydroxide scaling of the ED rinse compartment membranes may be blocked. The neutral pH is used by the ion exchange brine softener 314 to improve calcium and magnesium removal.

A resin of the ion exchange brine softener 314 is periodically regenerated with deionized water 296, HCl 98 solution, and/or caustic solution 138. The spent rinse water, spent HCl 98 solution, and/or spent caustic solution 138 may be routed back to process brine streams. The softened electrode rinse solution is mixed at an acid input 315 with a small amount of dilute sulfuric acid 316 from the EDBM unit 264, thereby decreasing a pH of the softened electrode rinse solution to approximately 4 to 5. The electrode rinse solution is then routed to the electrode rinse tank 318.

A dilution air blower 320 provides a positive flow of air through vapor space of the electrode rinse tank 318, thereby removing residual hydrogen gas from the electrode rinse tank 318, and blocking a potential buildup of hydrogen gas in the vapor space. The reduced pH of the electrode rinse tank may block carbonate contamination of the rinse solution from $CO_2$ absorption from the air. As illustrated, one or more gasses (e.g., air and/or trace amounts of $H_2$) may be removed from the electrode rinse tank 318 using a vent 322. In certain embodiments, a small purge stream of caustic 138 (e.g., a base) from the EDBM unit 264 may be used to maintain a pH of the electrode rinse tank 318 at approximately 4 to 5 (e.g., to direct the pH toward a mildly acidic pH).

Within the EDBM unit 264, dilute sulfuric acid 324 is pumped using a pump 326 to a path 328 to circulate the sulfuric acid 324 around the EDBM unit 264, thereby increasing its concentration. A portion of the EDBM unit 264 effluent sulfuric acid is extracted and routed to the air stripper 266 to direct its pH toward an acidic pH and to provide acid to the cathode 204 portion of the ED units 200 thereby blocking $Mg(OH)_2$ and $Ca(OH)_2$ scaling.

The dilute (5 wt %) caustic solution 330 is pumped using a pump 332 to a path 334 to circulate the caustic solution 330 around the EDBM unit 264, thereby increasing its concentration. A portion of the EDBM unit 264 caustic solution 330 is extracted and routed to the ion exchange brine softener 314 to direct its pH toward approximately 6 to 8, thereby neutralizing the excess acid injected into the softener 314 inlet. A purge flow of caustic solution is also extracted and purged to the process brine streams, thereby compensating for net leakage of NaOH into the electrode rinse solution from the process streams. Makeup sulfuric acid is not used because the EDBM unit 264 selectively extracts NaOH to maintain the acidic pH in the electrode rinse tank 318.

A softened pH controlled electrode rinse solution 336 is pumped using a pump 338 from the electrode rinse tank 318 through a filter 340 (e.g., cartridge filter) to the anode fluid output 250. Acid addition in the ED unit 200 is not used because acid is generated within the anode portion of the ED unit 200. As illustrated, the filtered electrode rinse solution 342 may be fed through the EDBM unit 264, and a return electrode rinse solution 344 may be directed to the anode fluid output 250. As may be appreciated, although the components of the ED electrode rinse system 248 have been described herein as operating using either the return anode rinse solution or the return cathode rinse solution, in some embodiments, the components of the ED electrode rinse system 248 may operate using any of the return anode rinse solution, the return cathode rinse solution, or some combination thereof.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a mineral removal system configured to be fluidly coupled to a reverse osmosis (RO) system and configured to receive a first brine stream from the RO system, wherein the mineral removal system comprises:
an electrodialysis (ED) system configured to generate an anode rinse return fluid and a cathode rinse return fluid from a second brine stream which is generated in a gypsum removal system disposed within the mineral removal system and configured to be fluidly coupled to the ED system and the RO system, wherein the gypsum removal system receives the first brine stream and generates the second brine stream;
a purification system fluidly coupled to the ED system, wherein the purification system is configured to receive the anode rinse return fluid and the cathode rinse return fluid, to remove ions from the anode and cathode rinse return fluids, and to generate an anode rinse fluid from the cathode rinse return fluid and a cathode rinse fluid from the anode rinse return fluid, wherein the purification system comprises:
a first input configured to be fluidly coupled to a first ED output of the ED system and to receive the anode rinse return fluid via an anode rinse return flow path extending from an anode portion of the ED system to the first input;
a first output configured to be fluidly coupled to a first ED input of the ED system and to provide a first portion of the anode rinse fluid to the first ED input via an anode rinse fluid flow path extending between the first output and the first ED input, wherein the anode rinse fluid is configured to remove the ions from the anode portion of the ED system to generate the anode rinse return fluid;
a second input configured to be fluidly coupled to a second ED output of the ED system and to receive the cathode rinse return fluid via a cathode rinse return flow path extending from a cathode portion of the ED system to the second input;
a second output configured to be fluidly coupled to a second ED input of the ED system and to provide the cathode rinse fluid to the cathode portion via a cathode rinse fluid flow path extending between the second output and the second ED input, wherein the cathode rinse fluid is configured to remove the ions from the cathode portion of the ED system to generate the cathode rinse return fluid;
an air stripper fluidly coupled to and disposed between the first input and the second output, wherein the air stripper is configured to receive the anode rinse return fluid and to remove oxygen, chlorine gas, or a combination thereof, from the anode rinse return fluid to generate the cathode rinse fluid, and
an electrodialysis bipolar membrane (EDBM) unit configured to receive a second portion of the anode rinse fluid via a first flow path extending between the EDBM and a second flow path, to produce an acid from the second portion of the anode rinse fluid, and to direct the acid to a third flow path extending between the first input and the second output and comprising the anode rinse return fluid, wherein a fourth flow path extending between the EDBM and the third flow path is configured to direct the acid to the third flow path upstream of the air stripper, wherein the second flow path is disposed within the purification system, extends between the second input and the first output of the purification system, wherein a portion of the second flow path comprises the anode rinse fluid generated from the cathode rinse return fluid within the purification system, wherein the portion of the second flow path directs the second portion of the anode rinse fluid to the first flow path and the first portion of the anode rinse fluid to the first output, and wherein the portion of the second flow path is fluidly coupled to the anode rinse fluid flow path.

2. The system of claim 1, wherein the purification system comprises a scrubber downstream from and fluidly coupled to a vent of the air stripper, wherein the scrubber is configured to produce a bleach solution using a vent gas generated in the air stripper from the anode rinse return fluid.

3. The system of claim 1, wherein the purification system comprises an acid input configured to supply the acid to a fifth flow path extending between the second input and the first output to adjust a pH of the cathode rinse return fluid to an acidic pH.

4. The system of claim 1, wherein the purification system comprises a vacuum flash drum configured to receive the cathode rinse return fluid and to remove hydrogen gas from the cathode rinse return fluid, and to generate a vacuum flashed cathode rinse return fluid.

5. The system of claim 1, wherein the purification system is configured to mix the anode rinse return fluid, the cathode rinse return fluid, or a combination thereof, with a base to adjust a pH of the anode rinse return fluid, the cathode rinse return fluid, or a combination thereof to a basic pH, wherein the EDBM is configured to generate the base from the second portion of the anode rinse fluid.

6. The system of claim 1, wherein the purification system comprises a softener fluidly coupled to the EDBM unit and configured to receive the cathode rinse return fluid and to remove calcium and magnesium from the cathode rinse return fluid to generate a softened cathode rinse return fluid.

7. The system of claim 6, wherein the purification system comprises a tank configured to receive the softened cathode rinse return fluid, to remove hydrogen gas from the cathode rinse return fluid, and to generate the anode rinse fluid.

8. The system of claim 7, comprising a sixth flow path configured to supply a base to the tank to adjust a pH of the anode rinse fluid to a basic pH, wherein the EDBM is configured to generate the base from the second portion of the anode rinse fluid.

9. A system comprising:
a mineral removal system configured to be fluidly coupled to a reverse osmosis (RO) system and configured to receive an input brine stream from the RO system and to recover minerals from the input brine stream, to generate an intermediate brine stream from the input brine stream, and to generate an output brine stream from the intermediate brine stream; wherein the mineral removal system comprises:
an electrodialysis (ED) system configured to generate an anode rinse return fluid and a cathode rinse return fluid from the intermediate brine stream generated within the mineral removal system;
a purification system fluidly coupled to the ED system and comprising:
a first input configured to be fluidly coupled to an anode portion of the ED system and to receive the anode rinse return fluid from the anode portion;
a first output configured to be fluidly coupled to the anode portion of the ED system and to provide an anode rinse fluid to the anode portion, wherein the purification system is configured to generate the anode rinse fluid from the cathode rinse return fluid, and wherein the anode rinse fluid is configured to remove ions from the anode portion of the ED system to generate the anode rinse return fluid;
a second input configured to be fluidly coupled to a cathode portion of the ED system and to receive the cathode rinse return fluid from the cathode portion;
a second output configured to be fluidly coupled to the cathode portion of the ED system and to provide a cathode rinse fluid to the cathode portion, wherein the purification system is configured to generate the cathode rinse fluid from the anode rinse return fluid, and wherein the cathode rinse fluid is configured to remove ions from the cathode portion of the ED system to generate the cathode rinse return fluid; and
an electrodialysis bipolar membrane (EDBM) unit configured to produce an acid, wherein the purification system is configured to mix the acid with the anode rinse return fluid to generate the cathode rinse fluid.

10. The system of claim 9, wherein the EDBM unit is configured to direct the acid to a flow path comprising the anode rinse return fluid, and wherein the system is configured to mix the acid with the anode rinse return fluid to adjust a pH of the anode rinse return fluid to an acidic pH.

11. The system of claim 9, wherein the EDBM unit is configured to direct a portion of the acid to a flow path comprising the cathode rinse return fluid, and wherein the system is configured to mix the acid with the cathode rinse return fluid to adjust a pH of the cathode rinse return fluid to an acidic pH.

12. The system of claim 9, wherein the EDBM unit is configured to produce a base and to direct the base to a flow path comprising the cathode rinse return fluid, and wherein the system is configured to mix the base with the cathode rinse return fluid to adjust a pH of the cathode rinse return fluid to a basic pH.

13. The system of claim 9, comprising a softener disposed within the purification system and configured to receive the cathode rinse return fluid, and to remove calcium and magnesium from the cathode rinse return fluid and to generate the anode rinse fluid.

14. A mineral removal system comprising a purification system, wherein the purification system comprises:
a first input configured to be fluidly coupled to an anode portion of an electrodialysis (ED) system and to receive an anode rinse return fluid from the anode portion;
a first output configured to be fluidly coupled to the anode portion of the ED system and to provide a first portion of an anode rinse fluid generated within the purification system to the anode portion via a first flow path extending between the first output and the anode portion of the ED system, wherein the anode rinse fluid is configured to remove ions from the anode portion of the ED to generate the anode rinse return fluid;
a second input configured to be fluidly coupled to a cathode portion of the ED system and to receive a cathode rinse return fluid from the cathode portion;
a second output configured to be fluidly coupled to the cathode portion of the ED system and to provide a cathode rinse fluid to the cathode portion via a second flow path extending between the second output and the cathode portion of the ED system, wherein the purification system is configured to treat the anode rinse return fluid to generate the cathode rinse fluid, and wherein the cathode rinse fluid is configured to remove ions from the cathode portion of the ED system to generate the cathode rinse return fluid;
a vacuum flash drum configured to receive the cathode rinse return fluid, and to remove hydrogen gas from the cathode rinse return fluid, and to generate an intermediate electrode rinse solution from the cathode rinse return fluid, wherein the anode rinse fluid is generated from the intermediate electrode rinse solution in a brine softener disposed downstream from the vacuum flash drum, and an electrodialysis bipolar membrane (EDBM) unit configured to receive a portion of the anode rinse fluid via a third flow path extending between the EDBM unit and a purification flow path, to produce an acid from the portion of the anode rinse fluid, and to direct the acid to the anode rinse fluid, wherein an acid flow path is configured to direct the acid to a fourth flow path comprising the anode rinse fluid downstream of the of the vacuum flash drum, and wherein the purification flow path is disposed within the purification system and extends between the vacuum flash drum and the first output.

15. The system of claim 14, comprising a pump fluidly coupled to the vacuum flash drum and configured to pump the hydrogen gas out of the vacuum flash drum.

16. The system of claim 14, wherein the purification system is configured to mix the anode rinse return fluid, the cathode rinse return fluid, or a combination thereof with a base to adjust a pH of the anode rinse return fluid, the cathode rinse return fluid, or a combination thereof to a basic pH, wherein the EDBM unit is configured to generate the base from the portion of the anode rinse return.

17. The system of claim 14, further comprising a tank configured to receive the anode rinse fluid and to remove hydrogen gas from the anode rinse fluid.

* * * * *